United States Patent
Wang et al.

(10) Patent No.: US 7,184,052 B2
(45) Date of Patent: Feb. 27, 2007

(54) REAL-TIME TEXTURE RENDERING USING GENERALIZED DISPLACEMENT MAPS

(75) Inventors: Xi Wang, Beijing (CN); Xin Tong, Beijing (CN); Stephen Lin, Beijing (CN); Baining Guo, Beijing (US); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 10/965,603

(22) Filed: Oct. 13, 2004

(65) Prior Publication Data

US 2005/0280646 A1 Dec. 22, 2005

Related U.S. Application Data

(60) Provisional application No. 60/580,780, filed on Jun. 18, 2004.

(51) Int. Cl.
- *G06T 17/00* (2006.01)
- *G06T 15/60* (2006.01)
- *G09G 5/00* (2006.01)
- *G06T 15/50* (2006.01)

(52) U.S. Cl. ............ 345/582; 345/420; 345/424; 345/426; 345/584

(58) Field of Classification Search ........ 345/418–428, 345/581–589, 643–644, 443; 382/254, 274, 382/285
See application file for complete search history.

(56) References Cited

U.S. PATENT DOCUMENTS 7,042,456 B2 * 5/2006 Chen et al. .................. 345/441

OTHER PUBLICATIONS

View-Dependent Displacement Mapping, Wang et al., AMC Inc., 2003, pp. 334-339.*

(Continued)

*Primary Examiner*—Kee M. Tung
*Assistant Examiner*—Wesner Sajous
(74) *Attorney, Agent, or Firm*—Lyon & Harr, LLP; Mark A. Watson

(57) ABSTRACT

A "mesostructure renderer" uses pre-computed multi-dimensional "generalized displacement maps" (GDM) to provide real-time rendering of general non-height-field mesostructures on both open and closed surfaces of arbitrary geometry. In general, the GDM represents the distance to solid mesostructure along any ray cast from any point within a volumetric sample. Given the pre-computed GDM, the mesostructure renderer then computes mesostructure visibility jointly in object space and texture space, thereby enabling both control of texture distortion and efficient computation of texture coordinates and shadowing. Further, in one embodiment, the mesostructure renderer uses the GDM to render mesostructures with either local or global illumination as a per-pixel process using conventional computer graphics hardware to accelerate the real-time rendering of the mesostructures. Further acceleration of mesostructure rendering is achieved in another embodiment by automatically reducing the number of triangles in the rendering pipeline according to a user-specified threshold for acceptable texture distortion.

20 Claims, 10 Drawing Sheets

OTHER PUBLICATIONS

Flux participation in Realise-Illuminance texture due to surface mesostructure; www-sop.inria.fr/robotvis/projects/Realise/Flux.html, pp. 1-2.*

Arvo J., Kirk D.: Fast ray tracing by ray classification. Computer Graphics (SIGGRAPH '87 Proceedings) 21, 4 (Jul. 1987), 55-64.

Blinn J. F.: Simulation of wrinkled surfaces. Computer Graphics (SIGGRAPH '78 Proceedings) 12, 3 (1978), 286-292.

Becker B. G., Max N. L.: Smooth transitions between bump rendering algorithms. Computer Graphics (SIGGRAPH '93 Proceedings) (1993), 183-190.

Cook R. L., Carpenter L., Catmull E.: The REYES image rendering architecture. Compute Graphics (SIGGRAPH '87 Proceedings) (1987), 95-102.

Carr N. A., Hall J. D., Hart J. C.: The Ray Engine. Proc. Graphics Hardware 2002 (2002).

Daubert K., Kautz J., Seidel H.-P., Heidrich W., Dischler J.-M.: Efficient light transport using precomputed visibility. IEEE Computer Graphics and Applications 23, 3 (May/Jun. 2003), 28-37.

Dana K. J., Nayar S. K., Van Ginneken B., Koenderink J. J.: Reflectance and texture of real-world surfaces. ACM TOG 18, 1 (Jan. 1999), 1-34.

Heidrich W., Daubert K., Kautz J., Sei-Del H.-P.: Illuminating micro geometry based on precomputed visibility. Computer Graphics (SIGGRAPH '00 Proceedings) (2000), 455-464.

Kajiya J. T., Kay T. L.: Rendering Fur with Three Dimensional Textures. Computer Graphics 23,3 (1989), 271-280.

Kautz J., McCool M. D.: Interactive rendering with arbitrary BRDFs using separable approximations. In Rendering Techniques (1999), pp. 247-260.

Lensch H. P. A., Daubert K., Seidel H.-P.: Interactive semi-transparent volumetric textures. Proc. Vision, Modeling and Visualization (2002), 505-512.

Lengyel J., Praun E., Finkelstein A., Hoppe H.: Real-Time Fur over Arbitrary Surfaces. Symposium on Interactive 3D Graphics (2001), 227-232.

Malzbender T., Gelb D., Wolters H.: Polynomial texture maps. Computer Graphics (SIGGRAPH '01 Proceedings) (Aug. 2001).

Meyer A., Neyret F.: Interactive volumetric textures. Eurographics Workshop on Rendering (1998), 157-168.

Neyret F.: Modeling, animating, and rendering complex scenes using volumetric textures. IEEE TVCG 4, 1 (Jan. 1998), 55-69.

Purcell T. J., Buck I., Mark W. R., Hanrahan P.: Ray tracing on programmable graphics hardware. ACM TOG (SIGGRAPH 2002) 21, 3(Jul. 2002), 703-712.

Sloan P.-P., Cohen M. F.: Interactive horizon mapping. Eurographics Workshop on Rendering (Jun. 2000), 281-286.

Sloan P.-P., Liu X., Shum H.-Y., Snyder J.: Bi-scale radiance transfer. Proceedings of SIGGRAPH 2003 (Aug. 2003), 370-381.

Wei L.-Y., Levoy M.: Texture synthesis over arbitrary manifold surfaces. Proceedings of SIGGRAPH 2001 (Aug. 2001), 355-360.

Wang L., Wang X., Tong X., Hu S., Guo B., Shum H.-Y.: View-dependent displacement mapping. Proceedings of SIGGRAPH 2003 22 (Jul. 2003), 334-339.

Cook R. L.: Shade trees. Computer Graphics (SIGGRAPH '84 Proceedings) 18, 3 (1984), 223-231.

* cited by examiner

Object Space

Texture Space

Object Space

Texture Space

Direction Projection

Error Distribution

REAL-TIME TEXTURE RENDERING USING GENERALIZED DISPLACEMENT MAPS

BACKGROUND

1. Technical Field

The invention is related to automatic texture mapping, and in particular, to a system and method for real-time rendering of arbitrary non-height-field mesostructures for open or closed surfaces of arbitrary geometry using a generalized displacement map (GDM) which generally represents a solid mesostructure distance along any ray cast from any point within a volumetric texture.

2. Related Art

Fine scale surface geometries, known as mesostructures, are an integral component in creating a realistic appearance for many real-world materials and objects. Computer rendering of such mesostructures provides not only fine resolution form to a surface, but also rich visual details such as fine-scale shading, shadows, occlusions and silhouettes. To enhance the realism of synthesized images, much attention has been focused on efficient and comprehensive methods for rendering mesostructures and their detailed appearance features.

Two of the most common approaches to mesostructure rendering include mapping images onto a surface and mapping geometry onto a surface. For example, conventional bidirectional texture functions (BTFs) record images of a mesostructure sample under different lighting and viewing directions, and then map the mesostructure sample to a target geometry. Unfortunately, because BTFs are merely 2-D images of mesostructure samples, those samples do not typically contain any 3-D geometric information. Consequently, silhouettes and the effects of surface curvature cannot typically be realistically rendered.

Some of the problems existing with the use of conventional BTF schemes have been addressed by first mapping mesostructure geometry onto a surface to form a highly detailed object model. The two dimensional mesostructure images are then mapped to the mesostructure geometry which has been mapped onto the surface to be textured. Such techniques have been used with conventional displacement maps and volumetric textures to render highly detailed visual effects of mesostructures. Unfortunately, because such models tend to be highly detailed, mapping mesostructures to such models is typically very computationally expensive. Further, conventional texture synthesis using displacement maps typically use only one offset value per texel. Consequently, such techniques are typically unable to handle arbitrary non-height-field mesostructures as discussed below.

The problem of high computational overhead when dealing with mapped mesostructure geometry in object space has been at least partially addressed by conventional schemes which pre-compute the visibility of mesostructure points and stores it in texture space. This technique has been referred to as "view-dependent displacement mapping," or simply as VDM. With the pre-computed mesostructure points, VDM has been shown to be capable of achieving real-time rendering of highly detailed mesostructure visual effects, including silhouettes.

Unfortunately, conventional VDM schemes have at least two significant drawbacks. First, VDM is applicable to height-field geometry on closed surfaces, and provides poor quality results, at best, on open surfaces. Second, due to a large computational overhead, VDM can be practically pre-computed for only a limited class of surface shapes, such as those having a single surface curvature parameter. As a result, the pre-computed VDM lacks the specificity to accurately represent surfaces with curvature variations and texture warping. As a result, VDM textured surfaces can often exhibit significant texture distortions in the synthesized textures.

Other conventional BTF schemes for mesostructure rendering include the use of polynomial texture maps which represent the mesostructure appearance of each surface point under different lighting directions by fitting a biquadric polynomial. Unfortunately, for non-diffuse surfaces, this approach models only a fixed viewpoint. Recently, another conventional BTF-based scheme integrated the BTF with a pre-computed radiance transfer of macro-scale geometry, and then rendered bi-scale lighting effects in real time. However, although these image-based representations are capable of capturing the true appearances of a general mesostructure sample, the 2-D geometric structure inherent in simple images of mesostructures precludes the rendering of mesostructure silhouettes. Therefore, most prior techniques assume that mesostructures have the form of height fields on a mesh, which is considered to be a 2-½ D representation.

Other conventional schemes have addressed rendering mesostructures that have height field geometry. Typically, such schemes are referred to, or are related to, "bump mapping." Such schemes offer an efficient approach to texturing mesostructures with a height-field geometry. Unfortunately, these schemes do not account for silhouettes. On the other hand, silhouettes can be rendered by displacement maps which explicitly model the geometric details of height fields. However, while techniques based on height field geometries benefit from relative ease in processing, they typically lack the generality to describe a range of surface geometries that includes weave patterns and slanted protrusions.

Some of the problems described above have been addressed by a number of schemes which use "volumetric textures" to provide a general 3D representation of mesostructure as volumetric data sampled on 3D regular grids. Traditionally, volumetric textures are rendered by tracing rays through a shell volume mapped on a surface. Unfortunately, such methods are computationally expensive and do not typically translate well to real-time applications.

A number of conventional schemes have improved on conventional volumetric texture rendering approaches by using a slice-based technique to improve overall performance. In general, such slice-based volumetric texture rendering schemes operate by rendering a volume prism extruded from each triangle of the 3D texture as a stack of axis-aligned textured slices.

For example, one conventional scheme uses a set of slices parallel to the projection plane to render the shell volume. Similarly, another related scheme is capable of mapping volumetric fur on a surface by rendering the fur as concentric layers from the skin outwards. In addition, this scheme also reduces visible artifacts by using extruded fins from triangle edges near the silhouette. Yet another related scheme applies a pre-computed visibility map to render shadowing effects of thin knitwear.

Unfortunately, in each of these slice-based methods, the number of slices used for each triangle increases with volumetric resolution. As a result, the computational overhead necessary for rendering such textures is further magnified when sophisticated per-pixel shading is incorporated. As a result, such schemes do not appear to be capable of rendering volumetric textures with global illumination in real-time using conventional computing techniques.

Related schemes have attempted to provide for rapid software rendering by using view-dependent distance data in volumes to accelerate ray tracing. For example, one conventional scheme uses ray tracing in texture space to map mesostructures onto base geometry. This scheme also uses a special data structure to further accelerate the software rendering. A related scheme pre-computes visibility information and then reuses that visibility information for shadow computation and indirect illumination. However, the problem with rendering of silhouettes is not adequately addressed by such schemes so as to provide for real-time rendering.

Therefore, what is needed is a system and method that is capable of rendering of general non-height-field mesostructures on both open and closed surfaces in real-time. It should also be noted that any height-field mesostructure can be represented as a non-height-field mesostructure. Further, such a system and method should reduce the texture distortions observed in conventional rendering schemes. Such a system and method should also be capable of rendering both silhouettes and shadows in real time. In addition, such a system and method should be capable of rendering such mesostructures in real-time while using either local or global illumination. Finally, what is needed is a system and method that provides the above noted capabilities while simultaneously reducing computational overhead so as to provide real-time rendering of highly detailed mesostructures for open or closed surfaces of arbitrary geometry.

SUMMARY

A "mesostructure renderer," as described herein operates to solve the problems of existing mesostructure rendering techniques through the use of a pre-computed multi-dimensional "generalized displacement map" (GDM). The GDM then is used to provide real-time rendering of highly detailed non-height-field mesostructures for rendering the mesostructure textures onto open or closed surfaces of arbitrary geometry. Further, it should be noted that any height-field mesostructure can also be represented as a non-height-field mesostructure. In rendering the mesostructures, the pre-computed GDM values facilitate texture coordinate computation of viewing rays whose piece-wise linear trajectory in texture space is determined in object space according to the shape of a base mesh upon which the mesostructure texture is to be rendered. Further, the GDM-based approach described herein overcomes both the texture distortion problems of conventional view-dependent displacement mapping (VDM) techniques and the computational expense of directly mapped mesostructure geometry by pre-computing mesostructure visibility jointly in texture space and object space.

In general, the mesostructure renderer provides a system for rendering mesostructures for arbitrary non-height-field geometries. Further, it should be noted that the mesostructure renderer is capable of using any conventional type of mesostructure, including, for example, tileable mesostructure samples or mesostructures generated via conventional mesostructure synthesis techniques. The system begins operation by first computing the aforementioned GDM from a given mesostructure geometry (either predefined or synthesized using conventional techniques). Computation of the GDM from the mesostructure generally involves computing a set of displacement values for points on a 3D grid, with each displacement value representing a distance from a predetermined starting point (i.e., the grid points) along a plurality of predetermined viewing directions to a nearest mesostructure surface.

Once the GDM is computed, conventional volumetric mapping is used to map the GDM onto an object model having a surface of arbitrary geometry represented by a triangle mesh. As should be appreciated by those skilled in the art, the use of volumetric mapping of a displacement map onto a surface represented by a triangle mesh will extrude each triangle vertex of the mesh towards its normal direction to generate a prism volume for each mesh triangle. Next, for each desired view of the object model, a set of rays are generated from a predetermined viewing point, with each ray extending through each pixel of a corresponding prism volume. The segment of each ray that exists within each prism volume is then identified, along with the point of entry and exit of each ray segment for its corresponding prism in object space. Each of these ray segments is then mapped to a corresponding ray segment in texture space.

The GDM is then used to determine intersections with the mesostructure geometry for each ray segment in texture space. Once these intersections with mesostructure geometry have been determined, the mesostructure renderer then renders visible mesostructure pixels for the surface of the object model by using texture information provided by the intersections with the mesostructure geometry for each ray segment in texture space. In one embodiment, rendering of the textured surface of the object model is performed as a real-time per-pixel operation using programmable graphics hardware to further accelerate mesostructure rendering on the target surface. In a related embodiment, further acceleration of mesostructure rendering is accomplished by providing a user adjustable threshold for allowable texture distortion. As the allowable distortion threshold is increased, the number of rendered triangles decreases, thereby resulting in a significant increase in overall frame rate.

In addition, by accounting for curvature variations and texture warping in object space, ray intersections in texture space are more accurately established, resulting in less texture distortion. The GDM approach of the mesostructure renderer is also useful for quickly determining whether any intersection point is shadowed from local illumination. Similarly, the GDM approach of the mesostructure renderer is also applicable for use in rendering scenes with global illumination.

In view of the above summary, it is clear that the mesostructure renderer described herein provides a unique system and method for rendering non-height-field mesostructures on both open and closed surfaces of arbitrary geometry in real-time using pre-computed generalized displacement maps. In addition to the just described benefits, other advantages of the mesostructure renderer will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
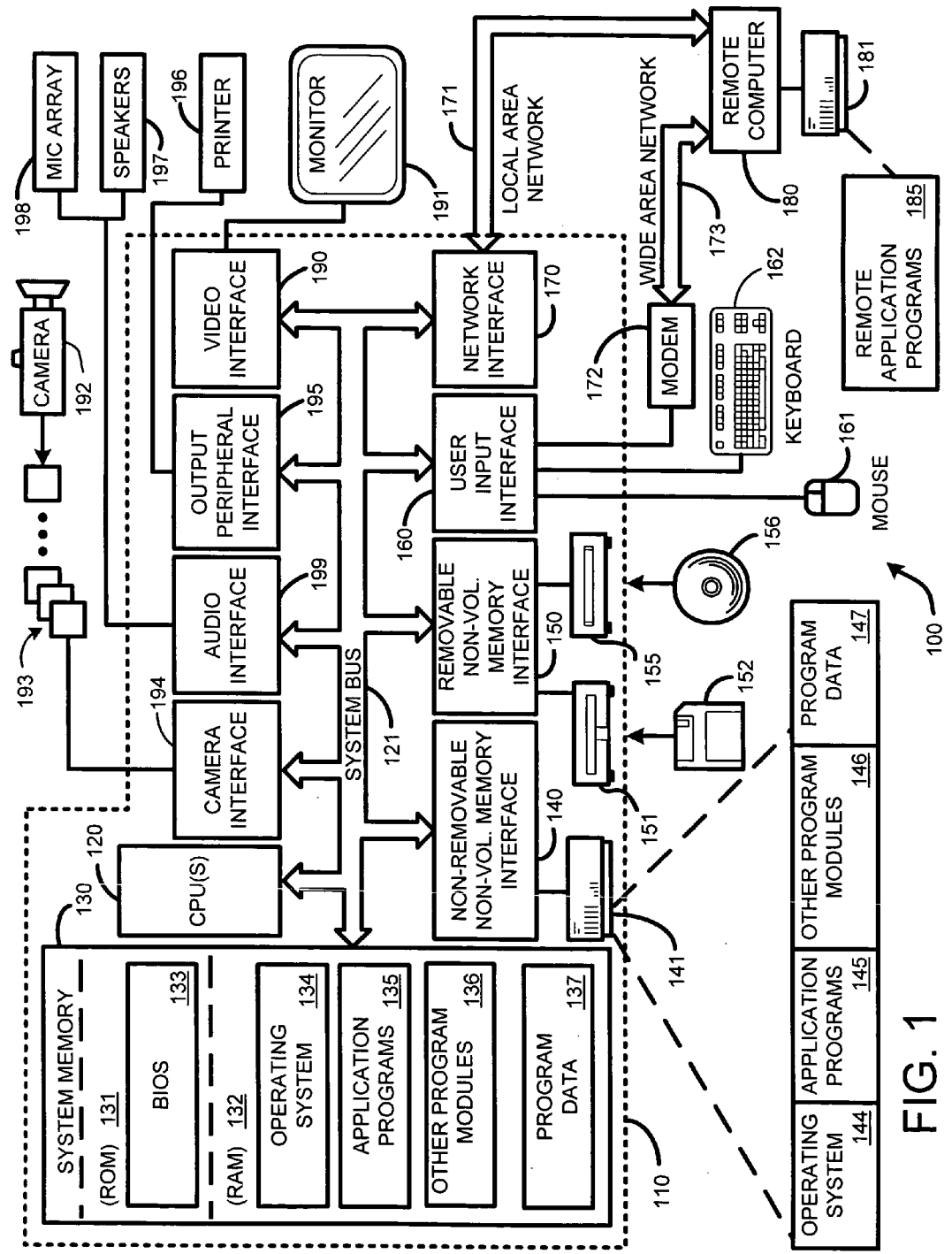
FIG. 1 is a general system diagram depicting a general-purpose computing device constituting an exemplary system implementing a mesostructure renderer, as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 110 typically includes a variety of computer readable media.

Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional interfaces, including, for example, USB, IEEE 1394, Bluetooth™, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "mesostructure renderer" which provides real-time rendering capabilities for non-height-field mesostructures.

2.0 Introduction:

A "mesostructure renderer," as described herein, provides a unique system and method for rendering non-height-field mesostructures on both open and closed surfaces of arbitrary geometry in real-time using a pre-computed "generalized displacement map" (GDM). Further, it should be noted that any height-field mesostructure can also be represented as a non-height-field mesostructure.

2.1 System Overview:

As noted above, the mesostructure renderer described herein provides a system and method for real-time rendering of highly detailed non-height-field mesostructure textures onto open or closed surfaces of arbitrary geometry. In rendering the mesostructures, the pre-computed GDM values facilitate texture coordinate computation of viewing rays whose piece-wise linear trajectory in texture space is determined in object space according to the shape of a base mesh upon which the mesostructure texture is to be rendered. Further, it should be noted that the mesostructure renderer is capable of using any conventional type of mesostructure, including, for example, tileable mesostructure samples or mesostructures generated via conventional mesostructure synthesis techniques.

The system begins operation by first computing the aforementioned GDM from a given mesostructure geometry by determining a set of displacement values for points on a 3D grid, with each displacement value representing a distance from a predetermined starting point (i.e., the grid points) along a plurality of predetermined viewing directions to a nearest mesostructure surface. Once this GDM is computed, conventional volumetric mapping is used to map the GDM onto an object model having a surface of arbitrary geometry represented by a triangle mesh. Volumetric mapping of the GDM onto a surface represented by a triangle mesh extrudes each triangle vertex of the mesh towards its normal direction to generate a prism volume for each mesh triangle.

Given these prism volumes, for each desired view of the object model, a set of rays are generated from a predetermined viewing point, with each ray extending through each pixel of a corresponding prism volume. The segment of each ray that exists within each prism volume is then identified, along with the point of entry and exit of each ray segment for its corresponding prism in object space. Each of these ray segments in object space is then mapped to a corresponding ray segment in texture space. The GDM is then used to determine intersections with the mesostructure geometry for each ray segment in texture space. Once these intersections with mesostructure geometry have been determined, the mesostructure renderer then renders visible mesostructure pixels for the surface of the object model by using texture information provided by the intersections with the mesostructure geometry for each ray segment in texture space. The result of this process is a highly detailed real-time rendering of a mesostructure texture onto the surface of the target object model.

Figure 2:
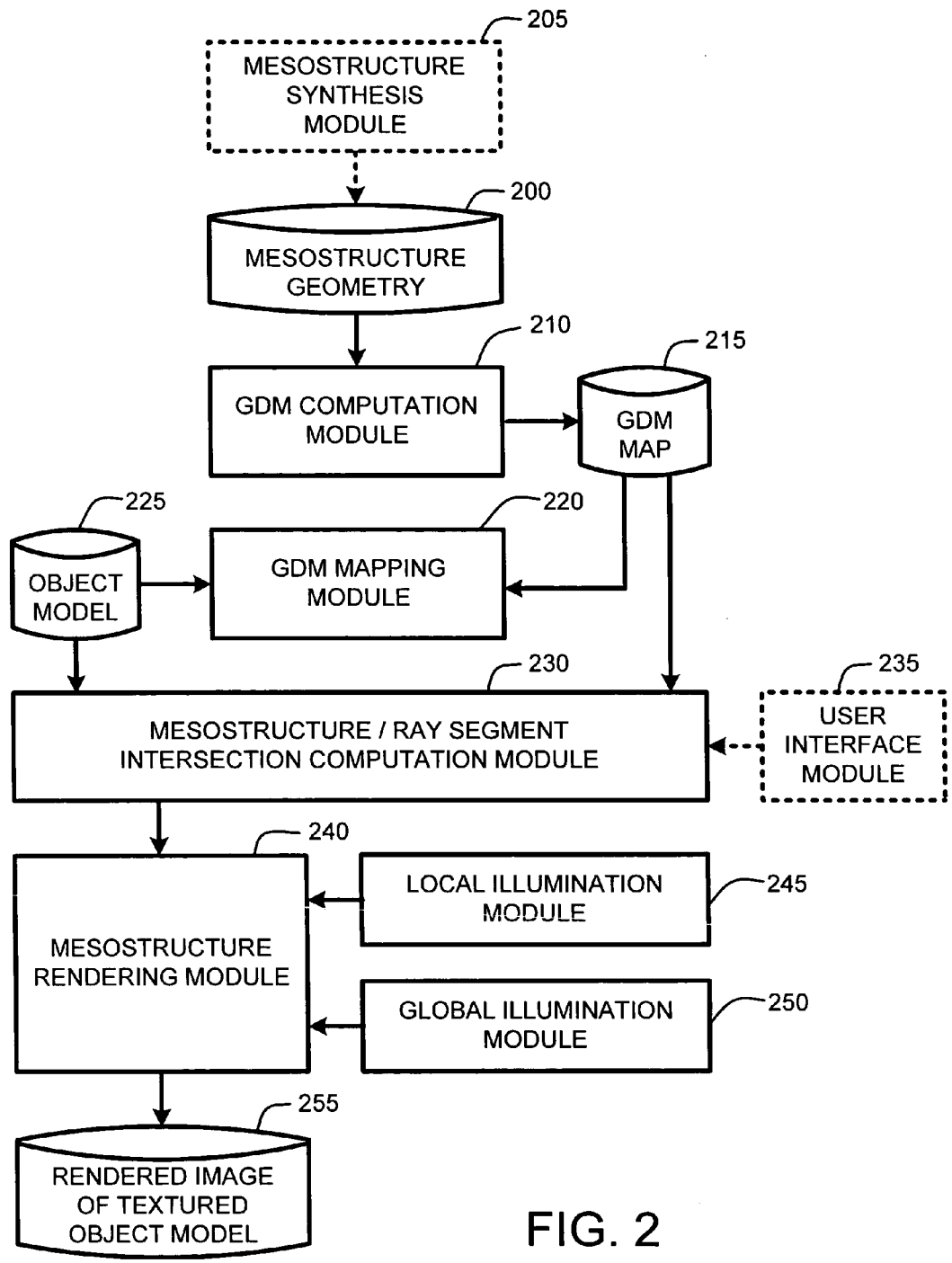
FIG. 2 illustrates an exemplary architectural system diagram showing exemplary program modules for implementing a mesostructure renderer, as described herein.

2.2 System Architectural Overview:

The processes summarized above are illustrated by the general system diagram of FIG. 2. In particular, the system diagram of FIG. 2 illustrates the interrelationships between program modules for implementing the mesostructure renderer, as described herein. It should be noted that any boxes and interconnections between boxes that are represented by broken or dashed lines in FIG. 2 represent alternate embodiments of the mesostructure renderer described herein, and that any or all of these alternate embodiments, as described below, may be used in combination with other alternate embodiments that are described throughout this document.

In general, as illustrated by FIG. 2, the mesostructure renderer first provides one or more known mesostructure geometries 200 to a GDM computation module 210. In one embodiment, the mesostructure geometry is synthesized by a mesostructure synthesis module 205 using conventional texture synthesis methods.

The GDM computation module 210 then pre-computes a GDM for the provided mesostructure geometries, as described below in detail in Section 3.2, by determining a distance to mesostructure surface from points on a three-dimensional (3D) regular grid via rays cast in a plurality of sampled viewing directions from each point. The GDM for each mesostructure is then stored in a database of GDM maps 215. It should be noted that any number of GDM maps can be pre-computed for various mesostructure geometries.

Given a pre-computed GDM, a GDM mapping module 220 then maps the GDM to the surface of an object model 225. The object model 225 is any conventional object model of arbitrary geometry that is represented by a triangular mesh. In general, as described in further detail below in Section 3.2, while the GDM is not actually a volumetric texture, it is mapped onto the surface of the object model 225 using conventional volumetric texture mapping techniques.

Once the GDM mapping module 220 has mapped the GDM 215 to the surface of the object model 225, a mesostructure/ray segment intersection computation module 230 then computes per-pixel ray intersections in object space from a predetermined or user specified viewing point (via a user interface module 235) through each of a plurality of prisms resulting from the mapping of the GDM to the triangular mesh of the object model. The mesostructure/ray segment intersection computation module 230 then maps each object space ray segment existing within each prism to a corresponding ray segment in texture space. Once each ray segment has been mapped to texture space, those ray segments are then used by the mesostructure/ray segment intersection computation module 230 in combination with the GDM to determine ray intersections with the mesostructure geometry 200.

Once the actual ray intersections with the mesostructure geometry are know for each ray segment, a mesostructure rendering module 240 then performs a per-pixel rendering process to render an image of the mesostructure textured object model from the specified viewpoint. Further, both local and global illumination effects are included in the rendering provided by the mesostructure rendering module 240 by using either or both a local illumination module 245 and a global illumination module 250, to address the illumination effects of local and global light sources, respectively. The final rendered image of the object model 255 is then output for immediate display in real-time, or stored for later use as desired.

As noted above, the viewing point may be user-specified. User specification of the desired viewpoint is accomplished via a user interface module 235 which allows the user to choose a desired viewpoint. In alternate embodiments, methods for choosing a desired viewpoint include user input of absolute or relative viewing coordinates, or by using a pointing device to rotate and/or position a view of the object model relative to a current viewpoint provided to the user. In addition, in one embodiment, the user interface 235 also allows the user to input a user-specified threshold for acceptable texture distortion. As described below with respect to system optimization in Section 3.4, setting a user-specified threshold for acceptable texture distortion provides for further acceleration of mesostructure rendering by automatically reducing the number of triangles in the rendering pipeline, with distortion increasing as the number of triangles decreases.

3.0 Operation Overview:

The above-described program modules are employed for implementing the mesostructure renderer described herein. As summarized above, this mesostructure renderer provides a system and method which provides highly detailed real-time rendering of a mesostructure texture onto the surface of a 3D target object model. The following sections provide a detailed discussion of the operation of the mesostructure renderer, and of exemplary methods for implementing the program modules described in Section 2 in view of the architectural system diagram of FIG. 2, as described above.

3.1 Operational Details of the Mesostructure Renderer:

In general, as noted above, the mesostructure renderer described herein first takes mesostructure geometry as an input and computes its GDM. The GDM is then volumetrically mapped to the surface of the target object model. A determination of ray segment intersection points with the mesostructure geometry is then used for rendering of the mesostructure texture to the object model using a per-pixel algorithm that can be accelerated in hardware.

The following paragraphs detail specific operational embodiments of the mesostructure renderer described herein. In particular, the following paragraphs describe GDM computation and modeling; rendering of the mesostructure onto an object model based on the computed GDM and GDM modeling; the use of local and global illumination in rendering, and both software and hardware acceleration of the GDM-based mesostructure rendering.

3.2 GDM Computation and Modeling:

The GDM values for a given mesostructure are computed at points on a 3D regular grid using an adaptation of conventional sampling algorithms for volumetric texture construction. It should be noted that with these sampling algorithms, artifacts may arise due to high-frequency mesostructure details. However, in one embodiment, such artifacts are reduced by using either higher sampling rates or through the use of mesostructure pre-filtering.

Computation of the GDM is straightforward. In particular, from each point $p=(x,y,z)$ of the 3D grid, a ray is cast toward sampled viewing directions, $\vec{V}$, where $\vec{V}$ is expressed in spherical angles for purposes of convenience, i.e., $\vec{V}=(\theta,\phi)$, with the polar angle $\theta$ ranging from 0 to $\pi$, and azimuth angle $\phi$ ranging from 0 to $2\pi$. Consequently, the GDM is a 5-dimensional or "5D" construct that is a function of x, y, z, $\theta$ and $\phi$. In general, this 5D GDM records the distance, $d_{GDM}(x,y,z,\theta,\phi)$, along each viewing direction to the nearest mesostructure surface from point p, where:

$$d_{GDM}(x, y, z, \theta, \phi) = \begin{cases} d & \text{if ray intersects mesostructure surface} \\ d_{max} & \text{if no intersection exists} \\ 0 & \text{if } p \text{ is inside a solid volume} \end{cases} \quad \text{Equation 1}$$

Figure 3:
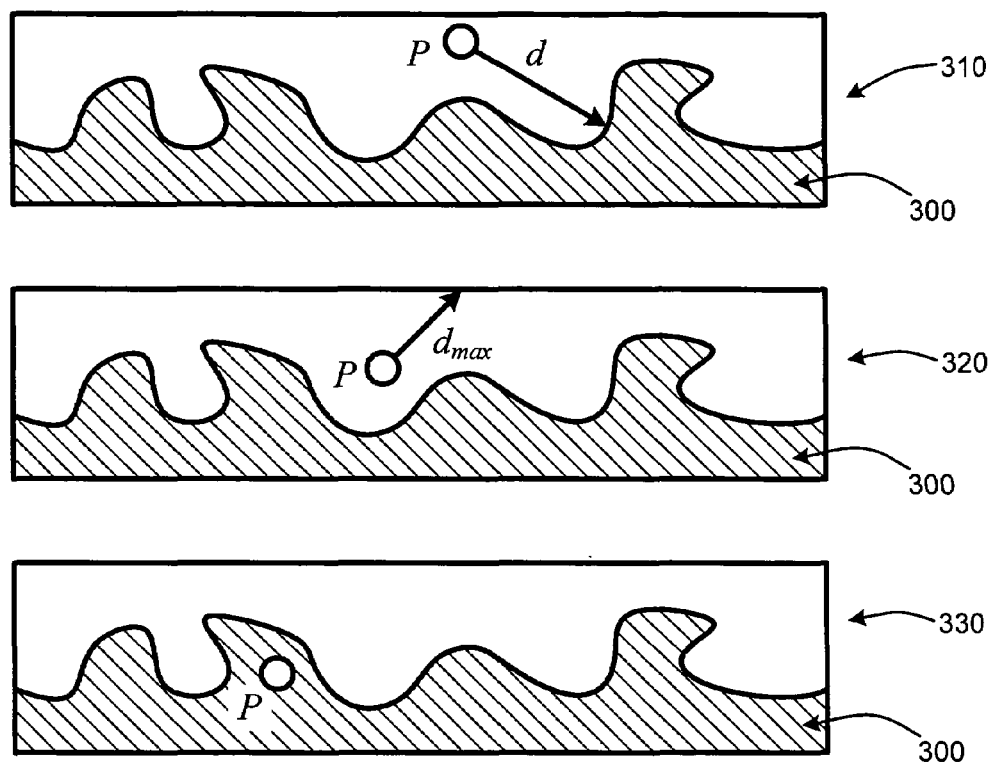
FIG. 3 illustrates three generic cases for measuring the values of a generalized displacement map (GDM) given an input mesostructure geometry, as described herein.

These three different cases for this measurement are illustrated by FIG. 3. In particular, in the first case 310, for points in free space or lying on the mesostructure surface 300, if the ray from p in direction $\vec{V}$ intersects mesostructure, the displacement is the distance d between p and the closest intersection. Further, in the second case 320, if no intersection exists with the mesostructure surface 300 for the direction $\vec{V}$, then a special value, $d_{max}$, is recorded that indicates this case. Finally, in the third case 330, for points located inside the solid volume of the mesostructure sample 300, its displacement value is set to zero. Note that in one embodiment, to ensure that rays exit through the top or bottom plane of the texture and not through the texture boundaries, the mesostructure volume is surrounded by identical tiles in the x,y-plane before computing the GDM. This is accomplished by using tileable mesostructure samples. As should be appreciated by those skilled in the art, an arbitrary volume texture can be made tileable by using conventional constrained texture synthesis techniques.

Figure 4A:
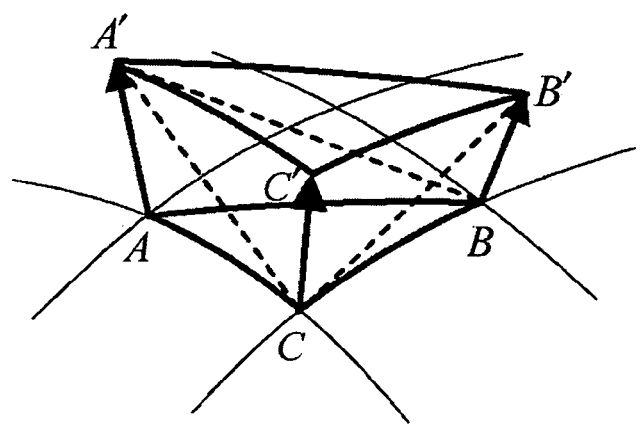
FIG. 4A illustrates an extruded prism in object space resulting from volumetric mapping of a GDM to the surface of an object model represented by a triangular mesh, as described herein.
Figure 4B:
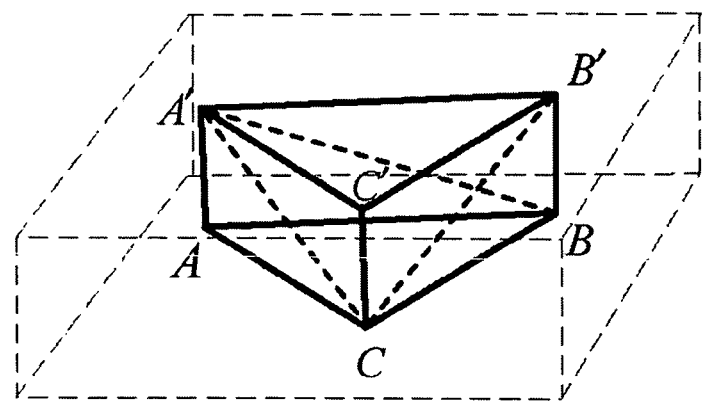
FIG. 4B illustrates a volume in texture space corresponding to the extruded prism in object space of FIG. 4A, as described herein.

GDM's are computed (or pre-computed so as to allow for real-time rendering) for as many mesostructure geometries as desired using the general techniques described above. The GDM is then mapped onto the triangular mesh representing the object model in the same manner as mapping a volumetric texture $V=(x,y,z)$, to that surface, with a 2D function of $(\theta,\phi)$ stored in each voxel. As is well understood by those skilled in the art, volumetric mapping of a volume texture onto a triangle mesh operates to extrude each triangle vertex towards its normal direction to generate a prism volume for each mesh triangle, as illustrated by FIG. 4A. Consequently, the mesostructure of each prism in the object space (FIG. 4A) is given by a corresponding volume in the texture space (FIG. 4B). Further, bilinear prism fins forming the sides of each prism are each approximated by two mesh triangles. Each fin is shared by two prisms, and its normal directions are defined outwards with respect to the prism currently being processed.

3.3 Rendering:

In contrast to conventional methods for volumetric texture rendering, the GDM rendering techniques utilized by the mesostructure renderer described herein do not trace rays through mesostructures synthesized onto a surface. Further, the GDM rendering techniques utilized by the mesostructure renderer described herein do not involve formation of numerous volume texture slices as with other conventional mesostructure rendering techniques.

Figure 5A:
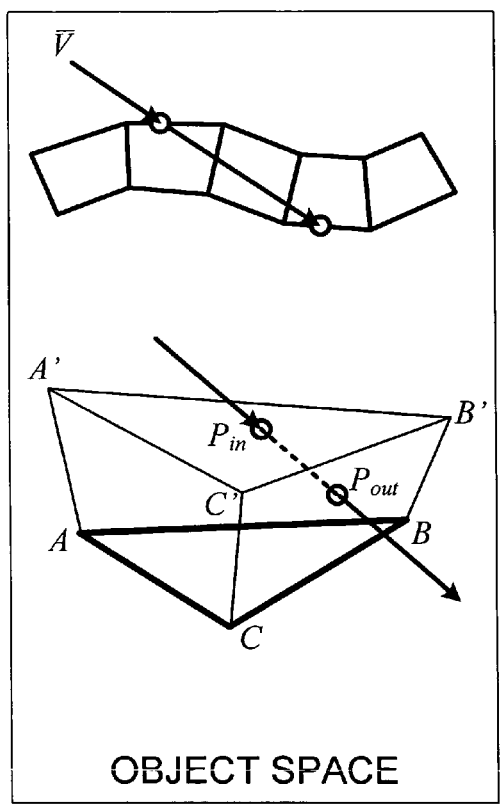
FIG. 5A illustrates a ray path through an extruded prism in object space, as described herein.
Figure 5B:
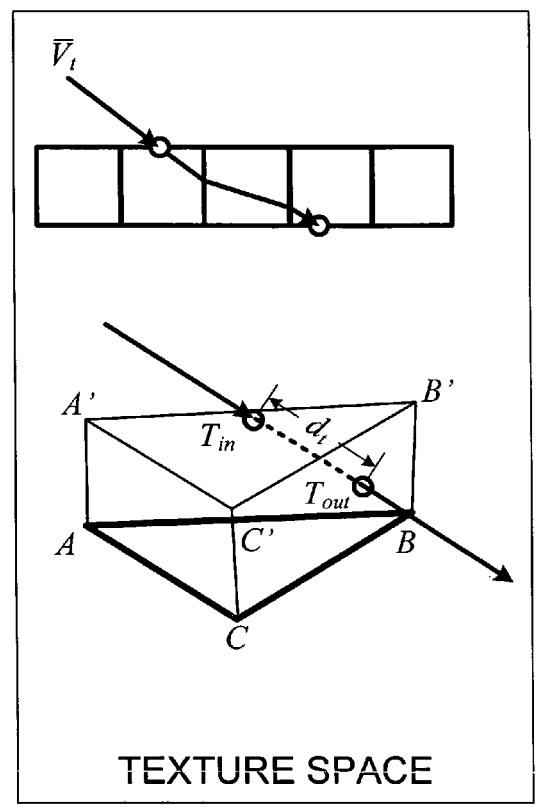
FIG. 5B illustrates a ray path in texture space corresponding to the ray path in object space of FIG. 5A, as described herein.

Instead, the mesostructure renderer described herein rapidly processes ray segments in each extruded prism jointly in both object space and texture space as illustrated in FIGS. 5A and 5B. In particular, in object space, a ray may pass through multiple prisms with varying orientations according to the shape of the base mesh. However, since mesostructure geometry is not explicitly represented in object space, each ray segment in a prism is mapped to a corresponding ray segment in texture space, as illustrated by FIG. 5B, to determine intersections with mesostructure geometry. For each prism, its ray in texture-space is approximated as a straight-line segment between the ray entrance and exit points of the prism. From the resulting piecewise-linear ray path in the texture space, the ray intersection can be rapidly determined from the GDM, which contains the displacements along each of these line segments, as described above.

This joint use of object and texture space for determining ray intersections benefits from greater efficiency by the use of the GDM in the texture space and from reduced texture distortion, since computing the ray path in object space accounts for variations in surface curvature and texture warping. In principle, the texture distortion can be made arbitrarily small by more finely tessellating a surface to obtain a more precise piecewise-linear ray path in texture space.

In rendering, each prism is processed individually and can be handled in any order. For each prism, its forward-facing sides, which may include prism fins and triangles of the base surface, are rasterized. For each rasterized face, its pixels are then processed by a rendering algorithm, which is summarized in the following pseudocode:

```
PixelShading (P_in, T_in)
    compute exit point (P_out, T_out) of ray segment in prism
    compute texture space length d_t = |T_out - T_in| of ray segment
    compute view direction V_t in texture space
    query the GDM value d_GDM(T_in,V_t) of p
    If (d_GDM < d_t)
        compute texture coordinate T of intersection point
        compute shading under local or global illumination
    Else
        no intersection
```

In the pixel shader, from the object and texture space coordinates $P_{in}$ and $T_{in}$ of the ray entrance point into the prism (as illustrated in FIGS. 5A and 5B), the prism exit point $P_{out}$ is first computed to obtain the texture space ray segment $\overline{T_{in}T_{out}}$. From this ray segment, the GDM is used to make a determination is made as to whether a mesostructure intersection point exists in the prism, as described in detail below in Section 3.3.1. If an intersection exists, its texture coordinate T is calculated with the GDM, and its shading under either local or global illumination is computed as described in further detail below in Sections 3.3.2 and 3.3.3, respectively.

3.3.1 Intersection Computation:

To render each pixel, the mesostructure intersection point of its cast ray must be computed along with the texture value of that scene point. For the traced ray of a pixel, its direction, V, prism entrance point, $P_{in}$, and corresponding texture coordinate, $T_{in}$, are known. To locate the other endpoint $T_{out}$ of the ray segment in texture space, the object space point $P_{out}$ must be computed where the traced ray would exit the prism if it were unimpeded by mesostructure geometry, as illustrated in FIG. 5B.

Figure 6A:
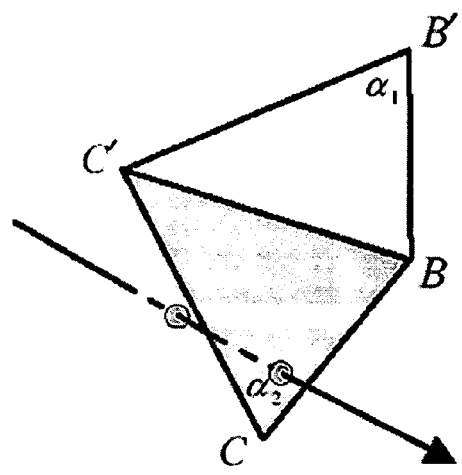
FIG. 6A illustrates determination of a ray exit point from an extruded prism for the case of a concave prism fin, as described herein.
Figure 6B:
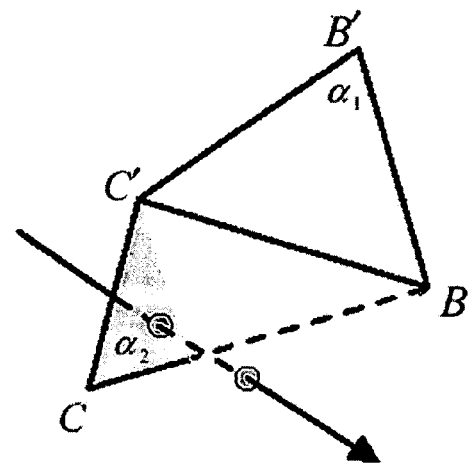
FIG. 6B illustrates determination of a ray exit point from an extruded prism for the case of a convex prism fin, as described herein.
Figure 6C:
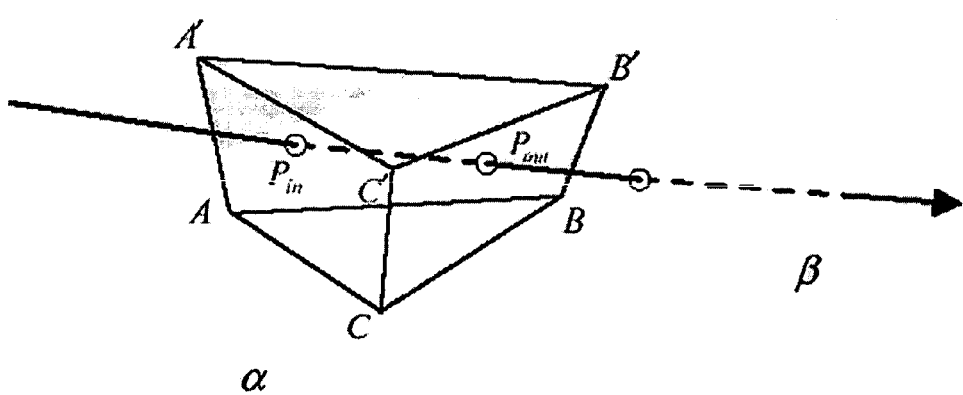
FIG. 6C illustrates a ray intersection with prism face planes, as described herein.

From $P_{in}$ and V, the position of $P_{out}$ can be calculated based on ray intersections with the planes defined by other faces of the prism as illustrated by FIG. 6C. Note that the mesostructure renderer described herein computes ray-plane intersections rather than hardware-accelerated ray-triangle intersections because ray-triangle intersection computations are complex in comparison and are performed per pixel. In contrast, ray-plane intersections involve only per-vertex calculations.

In particular, the intersection points are first computed for each fin on the two planes defined by its two triangles. As illustrated by FIG. 6A, if two triangles $\alpha_1, \alpha_2$ form a concave side of the prism, then the intersection for the face is determined as the one with the larger distance from $P_{in}$. If the triangles form a convex side as in FIG. 6B, then the intersection with the fin is taken as the point with the smaller distance. From the ray intersections on each face plane, $P_{out}$ is determined as the point with the smallest distance from $P_{in}$. The texture coordinate of $P_{out}$ is then assigned to $T_{out}$. From the texture-space ray segment defined by $T_{in}$ and $T_{out}$ the ray direction $V_t$ is approximated in texture space as $(T_{out}-T_{in})/d_t$, where the ray segment length is $d_t=\|T_{out}-T_{in}\|$. If $d_{GDM}(T_{in}, V_t) > d_t$, then the ray passes through the prism without intersection. Otherwise, the ray intersects mesostructure at a point P in the prism with texture coordinate:

$$T = T_{in} + d_{GDM}(T_{in}, V_t) \cdot V_t \qquad \text{Equation 2}$$

The value of T corresponding to point P is then used for rendering the corresponding pixel.

3.3.2 Local Illumination:

If the object model is illuminated by a local light source, the GDM can be used to determine whether P is shadowed by other parts of the mesostructure. This is accomplished by rendering a shadow map with the GDM and saving the distance of the ray intersection instead of the color. Note that this shadow map generation differs from the traditional techniques for computing shadow maps for an object model in that it is computed taking the mesostructure geometry into consideration, rather than just the object model itself.

Figure 7A:
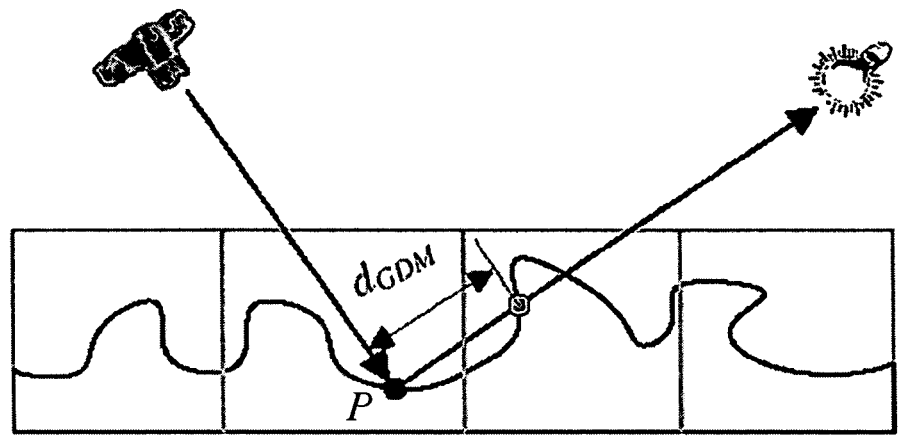
FIG. 7A illustrates shadow determination for local illumination of a shadowed point using a GDM, as described herein.
Figure 7B:
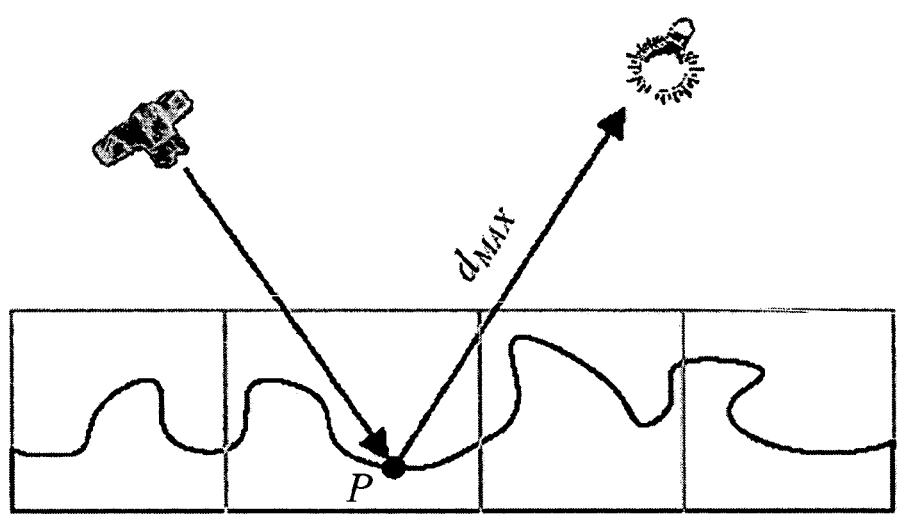
FIG. 7B illustrates shadow determination for local illumination of a directly illuminated point using a GDM, as described herein.

In particular, instead of computing a conventional shadow map, the mesostructure renderer described herein employs a more rapid solution by approximating the light trajectory $L_t$ of the local illumination source in the texture space as the object space light direction L. As illustrated in FIG. 7A, if $d_{GDM}(T, L)$ is not equal to $d_{max}$ (i.e., the distance from the ray intersection on the surface of the mesostructure geometry to the origin of the lighting), this indicates that P is occluded in the lighting direction. Conversely, as illustrated by FIG. 7B, if $d_{GDM}(T, L)$ is equal to $d_{max}$, this indicates that P is not occluded in the lighting direction.

If P is in shadow, its appearance is computed with ambient illumination only. Otherwise, P is shaded according to a given reflectance model with parameters stored in an additional 3D texture map. It should be noted that this technique accounts only for the fine-scale shadows of local mesostructure, and does not handle shadows from the base geometry or distant mesostructure. Also, it assumes the base geometry to be locally flat, since local shadow alias may occur in areas of high surface curvature. However, even with this assumption, acceptable results are achieved, as with conventional horizon maps. In a further embodiment conventional pixel shading techniques can be used in an additional shading pass to address any shadows caused by the base geometry of the object model or by distant mesostructure.

3.3.3 Global Illumination:

To compute the shading of P under global illumination, an adaptation of a conventional bi-scale radiance transfer framework is used. The conventional bi-scale radiance transfer technique pre-computes the transfer of global illumination at each vertex to illuminance at the meso-scale, and then computes the meso-scale response to this illuminance for each pixel. In contrast, the adaptation of this technique used by the mesostructure renderer defines the meso-scale response on mesostructure surface points, rather than on the reference plane. This response, called the radiance transfer volume (RTV), accounts for the shadowing and inter-reflection of the meso-scale lighting within the mesostructure volume, and is expressed as a set of 5D functions that correspond to spherical harmonic coefficients $f_{vrf}^i(x,y,z,\theta,\phi)$, i=0 ... k, where $(\theta,\phi)$ represents the viewing direction in spherical angles.

The number of spherical harmonic coefficients k is chosen by the user, (via the aforementioned user interface) and was set to 16 in a tested embodiment of the mesostructure renderer. With this spherical harmonic representation, the shading of a voxel is calculated simply by taking the inner product of the RTV vector and the meso-scale illuminance vector determined using a conventional pre-computed radiance transfer (PRT) algorithm. Note that the specific details of a hardware implementation of these techniques using conventional computer graphics hardware are discussed in Section 3.5.

Compared to conventional radiance transfer texture (RTT), which is defined on the reference plane, the RTV described above provides several benefits for bi-scale radiance transfer. First, both mesostructure silhouettes and its shading effects can be rendered with the RTV/GDM, while mesostructure silhouettes are ignored in bi-scale radiance transfer. Second, by representing reflectance with respect to mesostructure position, p, RTV obtains better compression because of greater data coherence in comparison to RTT, for which reflectance at a reference surface point corresponds to different mesostructure points depending on the viewing angle. As a result, little compression can be achieved in the view dimensions by RTT, relative to RTV. Finally, for curved surfaces, large viewing angles from the surface normal direction can result in significant differences in both position and local coordinate frames of P and p. This difference consequently introduces error in computing the incident illumination at p. More accurate incident illumination can be obtained using the mesostructure renderer and the RTV method described above because the prism fins partition the texture into smaller volumes.

3.4 Optimization:

As noted above, in mapping a GDM onto a mesh, each mesh triangle is extruded into a prism. This effectively quadruples the number of triangles in the original object model. Consequently, to speed up rendering computations, in one embodiment, the computational overhead required to render the image of the textured object model is decreased by using a method for determining prism fins that can be removed from the rendering pipeline without introducing texture distortion above a user-specified threshold. This effectively decreases the number of triangles that it is necessary to process during the rendering computations.

Figure 8A:
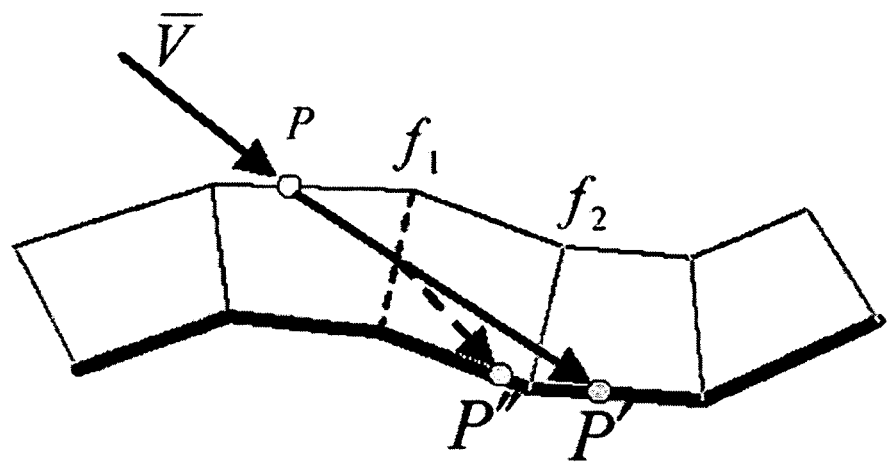
FIG. 8A illustrates ray trajectory error before and after fin removal in object space, as described herein.
Figure 8B:
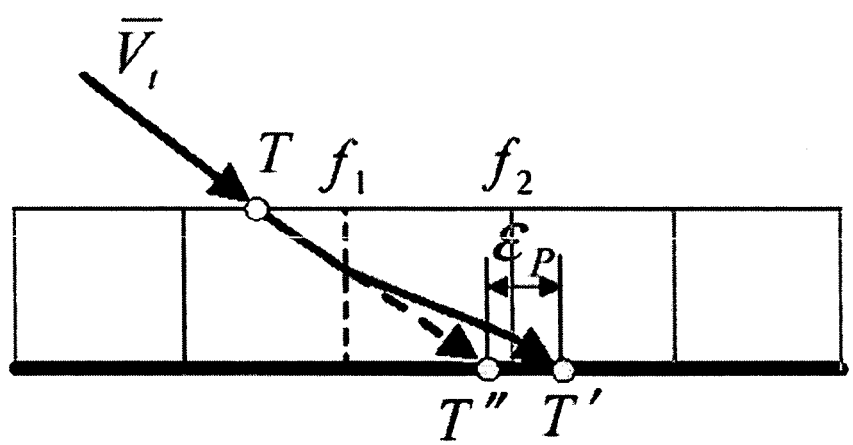
FIG. 8B illustrates ray trajectory error before and after fin removal in texture space, as described herein.

In particular, as illustrated in FIGS. 8A and 8B, the basic rendering techniques described in the preceding Sections approximates a ray through p along direction $\overline{V}$ by ray segments in each prism. As the ray enters a prism through a fin, $f_1$, it is re-directed in the texture space according to the local coordinate frame of the fin in object space. Consequently, the consequence of removing a fin is the additional texture distortion caused by the resulting discrepancy in ray trajectory. Therefore, the maximum texture coordinate error that is introduced by a fin removal can be approximated as the distance between the exit points from the volume texture, denoted as $\epsilon_p$ in FIG. 8B.

This distance, $\epsilon_p$, approximates the maximum texture distortion since the discrepancy in the ray path generally increases with deeper penetration into the texture volume. To discount the effect of subsequent fins on this distance, it is computed without consideration of other fins of the prism. While the true texture mapping distortion can only be determined with respect to the actual mapped mesostructure, this method has the advantage of being pre-computable, since it depends only on the underlying surface geometry.

In optimization, the error of removing fin $f_1$ is defined as the maximum error among all incident rays passing through $f_1$. To balance accuracy and rendering efficiency, the method described herein removes a fin only if the resulting introduced error lies below the aforementioend user-specified threshold $\epsilon$. Specifically, for each fin, the maximum error among a set of fin points is pre-computed for each sampled viewing direction. In a tested embodiment, the fin vertices were used as the sampled viewing directions. However, it should be appreciated that other viewing directions may also be used, as desired.

Figure 9A:
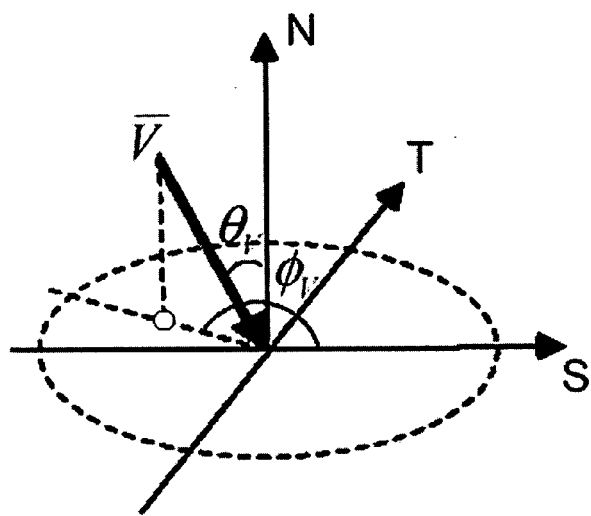
FIG. 9A illustrates the maximum error resulting from fin removal for various viewing direction, as described herein.
Figure 9B:
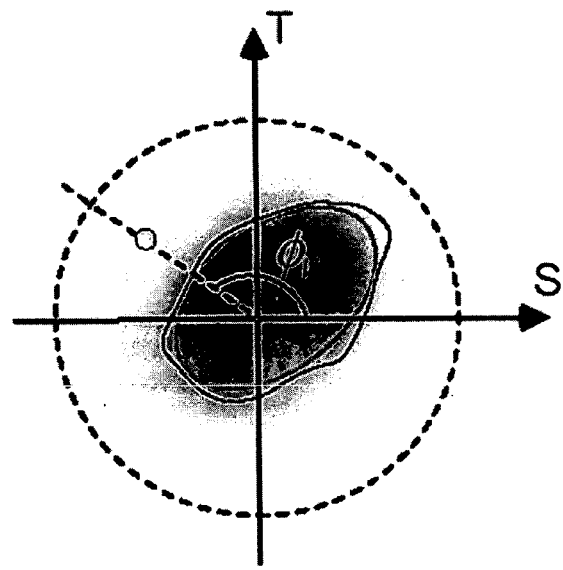
FIG. 9B illustrates error distribution of fine removal as a projection of view direction onto the texture plane, with lighter errors corresponding to larger error magnitudes, as described herein.

For a given fin, the maximum error for various viewing directions can be visualized as illustrated by FIG. 9A. In particular, each sampled viewing direction $\overline{V}$ is projected onto the S, T plane of the local coordinate system, and the intensity of the projected point is inversely proportional to error, which typically increases with respect to $\theta_V$. Similarly, as illustrated by FIG. 9B, which shows the error distribution on the texture plane, the lighter areas correspond to larger error magnitudes. The set of fin removal directions can be approximated by an ellipse that lies within the user-specified error threshold, $\epsilon$. For a given fin, to record the set of viewing directions with error below the user-specified threshold, a 1 D map is formed with respect to azimuth angle, $\phi_V$. However, in another embodiment, greater compactness is achieved by instead fitting an ellipse to the region and storing its parameters, similar to what has been done for conventional horizon maps and pre-computed visibility.

Figure 10:
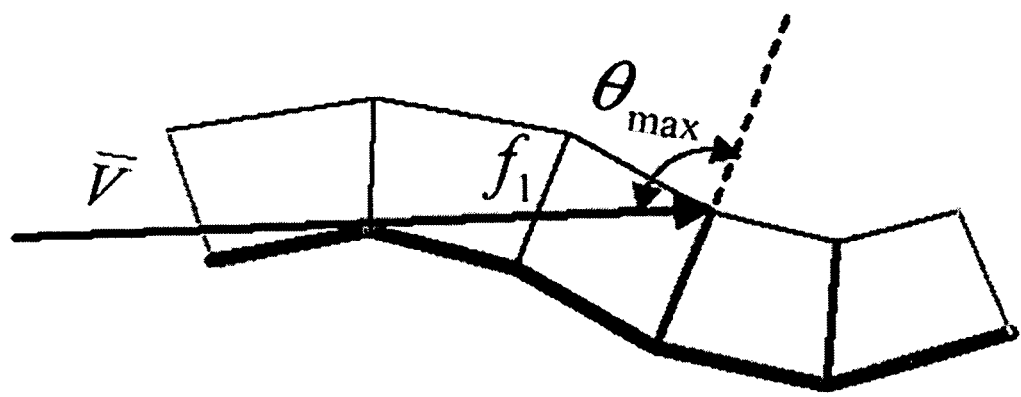
FIG. 10 illustrates a maximum view polar angle in fin culling, as described herein.

In another embodiment, an additional optimization for is provided for geometry textures without hole structures. In this case, the back faces of the underlying mesh, as illustrated by FIG. 10, can be culled as in conventional rendering algorithms. However, fins which are extruded from those back faces can not be automatically culled since some of these fins could actually be visible in the current view, as illustrated by fin $f_1$ in FIG. 10. Consequently, in one embodiment, a new culling technique is used to remove the fins that are totally occluded by the object itself.

In particular, for each vertex of the fin triangle lying on the top surface, the maximum view polar angle $\theta_{max}$ is recorded for each azimuth angle $\phi$ such that any ray $v_{74,\phi}$, with $\theta > \theta_{max}$ must be occluded by the underlying mesh. Note that the range of the polar angle is from $\pi/2$ to $\pi$. Then, during rendering, a fin triangle is only removed if the polar angle of the viewing direction is larger than the maximum view polar angles of its vertices, which occurs when the triangle is not visible in the current view. For each vertex, this is represented in a 1 D map formed with respect to azimuth angle $\theta_V$. Alternately, the ellipse fitting method described above may also be employed to parameterize and compress this data, as described in the preceding paragraph.

To fit this optimization scheme into the rendering system described above, each removed fin is marked, and the rendering procedure described above in Section 3.3 is modified for the two adjacent prisms. For example, as illustrated by the following pseudocode, the fin is still used to compute $P_{out}$ and $T_{out}$. In instances where $P_{out}$ lies on a removed fin, the texture space distance $d_t$ is set to $d_{max}$. Otherwise, $d_t$ is computed according to the original rendering system described above.

---

PixelShading($P_{in}$, $T_{in}$)
    compute exit point ($P_{out}$, $T_{out}$) of ray segment in prism
    compute view direction $V_t$ in texture space
    If ($P_{out}$ lies in a removed fin)
        set texture space length $d_t = d_{max}$
    Else
        compute texture space length $d_t = |T_{out} - T_{in}|$ of ray segment
        query the GDM value $d_{GDM}(T_{in}, V_t)$ of p
    If ($d_{GDM} < d_t$)
        compute texture coordinate T of intersection point
        shading computation
    Else
        no intersection

---

3.5 Hardware Implementation:

The following Sections describe methods for implementing the above described system and methods in conventional computer graphics hardware, and for accelerating the real-time rendering techniques described above using that conventional computer graphics hardware.

3.5.1 Data Compression:

Although the 5D GDM/RTV data could be reorganized into a 3D texture and directly loaded to hardware for rendering, it is still large with regard to the limited graphics memory. Moreover, the lower coherence among the reorganized data decreases the performance of the texture access time.

Consequently, in one embodiment, better performance and conservation of hardware memory is achieved by decomposing the GDM into several low dimensional maps. This is accomplished using conventional singular value decomposition (SVD), a method that has been used for compressing high dimensional data [KM99]. The high-dimensional GDM data is then reorganized into a 2D matrix A where the rows are indexed by $x,y,\phi$ and the columns are indexed by $\theta,Z$. Although these maps could be differently organized for decomposition, experiments have shown that this solution provides the best compromise between accuracy and storage for all data used in this paper. Applying SVD to A produces a set of 2D eigen-maps $E_i(\theta,z)$ and corresponding 3D weight maps $W_i(x,y,\phi)$. The GDM data can then be reconstructed from a small number of these eigen-maps as:

$$d_{GDM} = \sum_i W_i(x, y, \phi)E_i(\theta, z) \quad \text{Equation 3}$$

In practice, the special value $d_{max}$ in the GDM data results in high frequency variations in GDM data, which requires more eigen-maps for good reconstruction. To address this problem, $d_{max}$ is replaced with the distance between P and the ray intersection point at the top or bottom boundary of the volume, as shown in the middle row (320) of FIG. 3. In rendering, it is necessary tp query the properties of the intersection point to determine whether the intersection actually exists inside the prism. For compression, the RTV data is reorganized into matrices where the rows are indexed by x,y,z and columns are indexed by $\theta,\phi$. The RTV data is also compressed by SVD, and four eigen functions are used for representation.

3.5.2 Rendering Passes:

GDM-based rendering is performed in multiple passes on graphics hardware. In the first pass, GDM computation is performed to obtain the volumetric texture coordinates of the mesostructure point for each pixel. The exit point $P_{out}$ for each pixel is then computed in the pixel shader based on interpolated distance values stored in the prism vertices. Each prism vertex is then projected in direction V onto the plane of each back-facing prism triangle, and its distance is computed. These distances and their texture coordinates are then sent into the graphics pipeline as vertex attributes. After rasterization, the distances of the pixel p to each plane are interpolated from the vertex attributes and then input into the pixel shader to calculate $d_t$ and $\overline{V}_t$.

The shading computation is then done in the subsequent passes. For local illumination, the shadow test and shading computation can be finished by the pixel shader in one pass. However, for global illumination, the per-vertex matrix/vector multiplication is first computed on the CPU to obtain the incoming meso-scale radiance. Then the RTV vector for each pixel is reconstructed and dotted with the interpolated incoming radiance vector to obtain the final shading result in the pixel shader. Depending on hardware capability, the dot product of two vectors is finished in one or more rendering passes.

The foregoing description of the mesostructure renderer has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the mesostructure renderer. It is intended that the scope of the invention be limited not by this detailed description, but rather by the claims appended hereto.

What is claimed is:

1. A system for rendering mesostructures for arbitrary non-height-field geometries, comprising:

computing a generalized displacement map (GDM) from a mesostructure geometry;

performing volumetric texture mapping of the GDM onto a surface of arbitrary geometry represented by a triangle mesh to generate a prism volume for each of a plurality of triangles comprising the triangle mesh;

generating a ray from a desired viewpoint through each pixel of each prism volume and identifying a segment of each ray that is within the volume of each corresponding prism in object space;

mapping each ray segment to a corresponding ray segment in texture space;

using the GDM to determine intersections with the mesostructure geometry for each ray segment in texture space;

rendering visible mesostructure pixels for the surface of arbitrary geometry using texture information provided by the intersections with the mesostructure geometry for each ray segment in texture space.

2. The system of claim 1 further comprising accounting for effects of local illumination by using the GDM to determine whether any of the intersections are occluded by the geometry of the mesostructure.

3. The system of claim 1 wherein computing the GDM comprises computing a set of displacement values for points on a 3D grid, each said displacement value representing a distance from a predetermined starting point along a plurality of predetermined viewing directions to a nearest mesostructure surface.

4. The system of claim 1 wherein volumetric mapping of the GDM onto the surface of arbitrary geometry represented by a triangle mesh extrudes each triangle vertex of the mesh towards its normal direction to generate the prism volume for each triangle of the triangle mesh.

5. The system of claim 1 wherein using the GDM to determine intersections with the mesostructure geometry for each ray segment in texture space comprises approximating each ray in texture-space as a straight-line segment between ray entrance and exit points of the prism, and determining the ray intersection from the GDM based on a resulting piecewise-linear ray path in the texture space.

6. The system of claim 1 wherein the mesostructure geometry is tileable, and wherein ray exit through a top or bottom plane of the mesostructure is ensured by surrounding the mesostructure volume by identical tiles in the x,y-plane before computing the GDM.

7. The system of claim 6 wherein a non-tileable mesostructure geometry is transformed into the tileable mesostructure geometry by applying a constrained texture synthesis process to the non-tileable mesostructure geometry.

8. The system of claim 1 wherein the mesostructure geometry is automatically synthesized.

9. The system of claim 1 wherein the desired viewpoint is selectable via a user interface.

10. A method for real-time rendering of non-height-field mesostructures for a surface of arbitrary geometry, comprising using a computing device to:

generate a generalized displacement map (GDM) which describes a distance to a solid mesostructure surface along a plurality of rays cast from predetermined points within a volumetric texture represented by a mesostructure geometry;

volumetrically map the GDM onto a triangular mesh of arbitrary geometry, said volumetric mapping generating extruded prism volumes for each of a plurality of triangles comprising the triangular mesh, with each prism volume extending in a normal direction from its corresponding triangle;

for each prism volume, generate a ray from a fixed user selectable viewpoint through each pixel of each prism volume;

identify a segment of each ray that is within the volume of each corresponding prism in object space;

map each ray segment to texture space and determine ray segment intersections with the mesostructure geometry in texture space;

render visible pixels for the surface of the arbitrary geometry using texture information provided by the ray intersections with the mesostructure geometry.

11. The method of claim 10 further comprising determining whether any of the ray intersections in texture space are occluded by the geometry of the mesostructure, and using the determination of occlusion to provide local illumination effects to the rendered visible pixels.

12. The method of claim 10 wherein determining ray segment intersections with the mesostructure geometry in texture space comprises approximating each ray in texture-space as a straight-line segment between ray entrance and exit points of each corresponding prism volume, and determining the ray intersection from the GDM based on a resulting piecewise-linear ray path in texture space.

13. The method of claim 12 wherein the mesostructure geometry is tileable, and wherein ray exit through a top or bottom plane of the mesostructure prism volumes is ensured by surrounding the mesostructure volume by identical tiles in the x,y-plane before computing the GDM.

14. The method of claim 13 wherein a non-tileable mesostructure geometry is transformed into a tileable mesostructure geometry by applying a constrained texture synthesis process to the non-tileable mesostructure geometry prior to computing the GDM.

15. A computer-readable medium storing computer executable instructions for automatically rendering mesostructures for arbitrary non-height-field geometries, said computer executable instructions comprising:

computing a generalized displacement map (GDM) from a mesostructure geometry by determining a set of displacement values for points on a 3D grid, with each displacement value representing a distance from each of the grid points along a plurality of predetermined viewing directions to a nearest mesostructure surface;

volumetrically texture mapping the GDM onto a triangular geometric mesh, thereby extruding each of a plurality of triangles comprising the triangular geometric mesh in a normal direction to generate a prism volume for each triangle;

selecting a viewpoint;

working in object space, projecting a ray from the selected viewpoint through each pixel of each prism volume and identifying a segment of each ray that is within the volume of each corresponding prism;

mapping each identified ray segment to a corresponding ray segment in texture space;

in texture space, determining intersection points with the mesostructure geometry for each ray segment to identify mesostructure texture information corresponding to the intersection points;

computing visible pixel values by using the mesostructure texture information corresponding to the intersection points for defining pixel values, thereby rendering the mesostructure to the triangular geometric mesh.

16. The computer readable medium of claim 15 further comprising accounting for effects of local illumination by using the GDM to determine whether any of the intersections are occluded by the geometry of the mesostructure.

17. The computer readable medium of claim 15 wherein projecting a ray from the selected viewpoint through each prism volume comprises determining which prism volumes are directly visible from the selected viewpoint, and projecting rays only through the visible prism volumes for identifying the segment of each ray that is within the volume of each corresponding prism.

18. The computer readable medium of claim 15 wherein identifying the segment of each ray that is within the volume of each corresponding prism comprises approximating each ray in texture-space as a straight-line segment between ray entrance and exit points of each corresponding prism by using the GDM to construct a piecewise-linear ray path in the texture space for each ray.

19. The computer readable medium of claim 15 wherein the mesostructure geometry is made tileable by applying a constrained texture synthesis process to the mesostructure geometry, and wherein ray exit through a top or bottom plane of the mesostructure volume is ensured by surrounding the mesostructure volume by identical tiles in the x,y-plane before computing the GDM.

20. The computer readable medium of claim 15 wherein the mesostructure geometry is automatically synthesized.

* * * * *